United States Patent
Klein

(10) Patent No.: US 8,355,511 B2
(45) Date of Patent: Jan. 15, 2013

(54) SYSTEM AND METHOD FOR ENVELOPE-BASED ACOUSTIC ECHO CANCELLATION

(75) Inventor: David Klein, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 1066 days.

(21) Appl. No.: 12/077,436

(22) Filed: Mar. 18, 2008

(65) Prior Publication Data

US 2009/0238373 A1 Sep. 24, 2009

(51) Int. Cl.
  H04B 3/20 (2006.01)
  H04B 15/00 (2006.01)
  H04M 9/08 (2006.01)

(52) U.S. Cl. ............ 381/66; 381/94.3; 379/406.14

(58) Field of Classification Search .......... 381/66; 379/406.01–406.16
  See application file for complete search history.

(56) References Cited

U.S. PATENT DOCUMENTS

| | | |
|---|---|---|
| 3,976,863 A | 8/1976 | Engel |
| 3,978,287 A | 8/1976 | Fletcher et al. |
| 4,137,510 A | 1/1979 | Iwahara |
| 4,433,604 A | 2/1984 | Ott |
| 4,516,259 A | 5/1985 | Yato et al. |
| 4,535,473 A | 8/1985 | Sakata |
| 4,536,844 A | 8/1985 | Lyon |
| 4,581,758 A | 4/1986 | Coker et al. |
| 4,628,529 A | 12/1986 | Borth et al. |
| 4,630,304 A | 12/1986 | Borth et al. |
| 4,649,505 A | 3/1987 | Zinser, Jr. et al. |
| 4,658,426 A | 4/1987 | Chabries et al. |
| 4,674,125 A | 6/1987 | Carlson et al. |
| 4,718,104 A | 1/1988 | Anderson |
| 4,811,404 A | 3/1989 | Vilmur et al. |
| 4,812,996 A | 3/1989 | Stubbs |
| 4,864,620 A | 9/1989 | Bialick |

(Continued)

FOREIGN PATENT DOCUMENTS

JP 62110349 5/1987

(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

(Continued)

Primary Examiner — Matthew Landau
Assistant Examiner — Khaja Ahmad
(74) Attorney, Agent, or Firm — Carr & Ferrell LLP

(57) ABSTRACT

Systems and methods for envelope-based acoustic echo cancellation in a communication device are provided. In exemplary embodiments, a primary acoustic signal is received via a microphone of the communication device, and a far-end signal is received via a receiver. Frequency analysis is performed on the primary acoustic signal and the far-end acoustic signal to obtain frequency sub-bands. An echo gain mask based on magnitude envelopes of the primary and far-end acoustic signals for each frequency sub-band is generated. A noise gain mask based on at least the primary acoustic signal for each frequency sub-band may also be generated. A combination of the echo gain mask and noise gain mask may then be applied to the primary acoustic signal to generate a masked signal. The masked signal is then output.

23 Claims, 7 Drawing Sheets

U.S. PATENT DOCUMENTS

| | | | |
|---|---|---|---|
| 4,920,508 A | 4/1990 | Yassaie et al. |
| 5,027,410 A | 6/1991 | Williamson et al. |
| 5,054,085 A | 10/1991 | Meisel et al. |
| 5,058,419 A | 10/1991 | Nordstrom et al. |
| 5,099,738 A | 3/1992 | Hotz |
| 5,119,711 A | 6/1992 | Bell et al. |
| 5,142,961 A | 9/1992 | Paroutaud |
| 5,150,413 A | 9/1992 | Nakatani et al. |
| 5,175,769 A | 12/1992 | Hejna, Jr. et al. |
| 5,187,776 A | 2/1993 | Yanker |
| 5,208,864 A | 5/1993 | Kaneda |
| 5,210,366 A | 5/1993 | Sykes, Jr. |
| 5,224,170 A | 6/1993 | Waite, Jr. |
| 5,230,022 A | 7/1993 | Sakata |
| 5,289,273 A | 2/1994 | Lang |
| 5,319,736 A | 6/1994 | Hunt |
| 5,323,459 A | 6/1994 | Hirano |
| 5,341,432 A | 8/1994 | Suzuki et al. |
| 5,381,473 A | 1/1995 | Andrea et al. |
| 5,381,512 A | 1/1995 | Holton et al. |
| 5,400,409 A | 3/1995 | Linhard |
| 5,402,493 A | 3/1995 | Goldstein |
| 5,402,496 A | 3/1995 | Soli et al. |
| 5,471,195 A | 11/1995 | Rickman |
| 5,473,702 A | 12/1995 | Yoshida et al. |
| 5,473,759 A | 12/1995 | Slaney et al. |
| 5,479,564 A | 12/1995 | Vogten et al. |
| 5,502,663 A | 3/1996 | Lyon |
| 5,544,250 A | 8/1996 | Urbanski |
| 5,574,824 A | 11/1996 | Slyh et al. |
| 5,583,784 A | 12/1996 | Kapust et al. |
| 5,587,998 A * | 12/1996 | Velardo et al. ................. 370/289 |
| 5,590,241 A | 12/1996 | Park et al. |
| 5,602,962 A | 2/1997 | Kellermann |
| 5,675,778 A | 10/1997 | Jones |
| 5,682,463 A | 10/1997 | Allen et al. |
| 5,694,474 A | 12/1997 | Ngo et al. |
| 5,706,395 A | 1/1998 | Arslan et al. |
| 5,717,829 A | 2/1998 | Takagi |
| 5,729,612 A | 3/1998 | Abel et al. |
| 5,732,189 A | 3/1998 | Johnston et al. |
| 5,749,064 A | 5/1998 | Pawate et al. |
| 5,757,937 A | 5/1998 | Itoh et al. |
| 5,792,971 A | 8/1998 | Timis et al. |
| 5,796,819 A | 8/1998 | Romesburg |
| 5,806,025 A | 9/1998 | Vis et al. |
| 5,809,463 A | 9/1998 | Gupta et al. |
| 5,825,320 A | 10/1998 | Miyamori et al. |
| 5,839,101 A | 11/1998 | Vahatalo et al. |
| 5,845,243 A | 12/1998 | Smart et al. |
| 5,920,840 A | 7/1999 | Satyamurti et al. |
| 5,933,495 A | 8/1999 | Oh |
| 5,943,429 A | 8/1999 | Handel |
| 5,956,674 A | 9/1999 | Smyth et al. |
| 5,974,380 A | 10/1999 | Smyth et al. |
| 5,978,824 A | 11/1999 | Ikeda |
| 5,983,139 A | 11/1999 | Zierhofer |
| 5,990,405 A | 11/1999 | Auten et al. |
| 6,002,776 A | 12/1999 | Bhadkamkar et al. |
| 6,061,456 A | 5/2000 | Andrea et al. |
| 6,072,881 A | 6/2000 | Linder |
| 6,097,820 A | 8/2000 | Turner |
| 6,108,626 A | 8/2000 | Cellario et al. |
| 6,122,610 A | 9/2000 | Isabelle |
| 6,134,524 A | 10/2000 | Peters et al. |
| 6,137,349 A | 10/2000 | Menkhoff et al. |
| 6,140,809 A | 10/2000 | Doi |
| 6,173,255 B1 | 1/2001 | Wilson et al. |
| 6,180,273 B1 | 1/2001 | Okamoto |
| 6,205,422 B1 | 3/2001 | Gu et al. |
| 6,216,103 B1 | 4/2001 | Wu et al. |
| 6,219,408 B1 | 4/2001 | Kurth |
| 6,222,927 B1 | 4/2001 | Feng et al. |
| 6,223,090 B1 | 4/2001 | Brungart |
| 6,226,616 B1 | 5/2001 | You et al. |
| 6,263,307 B1 | 7/2001 | Arslan et al. |
| 6,266,633 B1 | 7/2001 | Higgins et al. |
| 6,317,501 B1 | 11/2001 | Matsuo |
| 6,321,193 B1 | 11/2001 | Nystrom et al. |
| 6,339,758 B1 | 1/2002 | Kanazawa et al. |
| 6,355,869 B1 | 3/2002 | Mitton |
| 6,363,345 B1 | 3/2002 | Marash et al. |
| 6,381,570 B2 | 4/2002 | Li et al. |
| 6,430,295 B1 | 8/2002 | Handel et al. |
| 6,434,417 B1 | 8/2002 | Lovett |
| 6,449,586 B1 | 9/2002 | Hoshuyama |
| 6,453,289 B1 | 9/2002 | Ertem et al. |
| 6,469,732 B1 | 10/2002 | Chang et al. |
| 6,487,257 B1 | 11/2002 | Gustafsson et al. |
| 6,496,795 B1 | 12/2002 | Malvar |
| 6,513,004 B1 | 1/2003 | Rigazio et al. |
| 6,516,066 B2 | 2/2003 | Hayashi |
| 6,529,606 B1 | 3/2003 | Jackson, Jr. II et al. |
| 6,549,630 B1 | 4/2003 | Bobisuthi |
| 6,584,203 B2 | 6/2003 | Elko et al. |
| 6,622,030 B1 * | 9/2003 | Romesburg et al. .......... 455/570 |
| 6,717,991 B1 | 4/2004 | Gustafsson et al. |
| 6,718,309 B1 | 4/2004 | Selly |
| 6,738,482 B1 | 5/2004 | Jaber |
| 6,748,095 B1 | 6/2004 | Goss |
| 6,760,450 B2 | 7/2004 | Matsuo |
| 6,785,381 B2 | 8/2004 | Gartner et al. |
| 6,792,118 B2 | 9/2004 | Watts |
| 6,795,558 B2 | 9/2004 | Matsuo |
| 6,798,886 B1 | 9/2004 | Smith et al. |
| 6,810,273 B1 | 10/2004 | Mattila et al. |
| 6,882,736 B2 | 4/2005 | Dickel et al. |
| 6,915,264 B2 | 7/2005 | Baumgarte |
| 6,917,688 B2 | 7/2005 | Yu et al. |
| 6,944,510 B1 | 9/2005 | Ballesty et al. |
| 6,978,159 B2 | 12/2005 | Feng et al. |
| 6,982,377 B2 | 1/2006 | Sakurai et al. |
| 6,999,582 B1 | 2/2006 | Popovic et al. |
| 7,016,507 B1 | 3/2006 | Brennan |
| 7,020,605 B2 | 3/2006 | Gao |
| 7,031,478 B2 | 4/2006 | Belt et al. |
| 7,054,452 B2 | 5/2006 | Ukita |
| 7,065,485 B1 | 6/2006 | Chong-White et al. |
| 7,072,834 B2 | 7/2006 | Zhou |
| 7,076,315 B1 | 7/2006 | Watts |
| 7,092,529 B2 | 8/2006 | Yu et al. |
| 7,092,882 B2 | 8/2006 | Arrowood et al. |
| 7,099,821 B2 | 8/2006 | Visser et al. |
| 7,142,677 B2 | 11/2006 | Gonopolskiy et al. |
| 7,146,316 B2 | 12/2006 | Alves |
| 7,155,019 B2 | 12/2006 | Hou |
| 7,164,620 B2 | 1/2007 | Hoshuyama |
| 7,171,008 B2 | 1/2007 | Elko |
| 7,171,246 B2 | 1/2007 | Mattila et al. |
| 7,174,022 B1 | 2/2007 | Zhang et al. |
| 7,206,418 B2 | 4/2007 | Yang et al. |
| 7,209,567 B1 | 4/2007 | Kozel et al. |
| 7,225,001 B1 | 5/2007 | Eriksson et al. |
| 7,242,762 B2 | 7/2007 | He et al. |
| 7,246,058 B2 | 7/2007 | Burnett |
| 7,254,242 B2 | 8/2007 | Ise et al. |
| 7,359,520 B2 | 4/2008 | Brennan et al. |
| 7,383,179 B2 | 6/2008 | Alves et al. |
| 7,412,379 B2 | 8/2008 | Taori et al. |
| 7,433,907 B2 | 10/2008 | Nagai et al. |
| 7,555,075 B2 | 6/2009 | Pessoa et al. |
| 7,555,434 B2 | 6/2009 | Nomura et al. |
| 7,617,099 B2 | 11/2009 | Yang et al. |
| 7,949,522 B2 | 5/2011 | Hetherington et al. |
| 8,098,812 B2 | 1/2012 | Fadili et al. |
| 2001/0016020 A1 | 8/2001 | Gustafsson et al. |
| 2001/0031053 A1 | 10/2001 | Feng et al. |
| 2001/0038699 A1 | 11/2001 | Hou |
| 2002/0002455 A1 | 1/2002 | Accardi et al. |
| 2002/0009203 A1 | 1/2002 | Erten |
| 2002/0041693 A1 | 4/2002 | Matsuo |
| 2002/0080980 A1 | 6/2002 | Matsuo |
| 2002/0106092 A1 | 8/2002 | Matsuo |
| 2002/0116187 A1 | 8/2002 | Erten |
| 2002/0133334 A1 | 9/2002 | Coorman et al. |
| 2002/0147595 A1 | 10/2002 | Baumgarte |
| 2002/0184013 A1 | 12/2002 | Walker |

| | | |
|---|---|---|
| 2003/0014248 A1 | 1/2003 | Vetter |
| 2003/0026437 A1 | 2/2003 | Janse et al. |
| 2003/0033140 A1 | 2/2003 | Taori et al. |
| 2003/0039369 A1 | 2/2003 | Bullen |
| 2003/0040908 A1 | 2/2003 | Yang et al. |
| 2003/0061032 A1 | 3/2003 | Gonopolskiy |
| 2003/0063759 A1 | 4/2003 | Brennan et al. |
| 2003/0072382 A1 | 4/2003 | Raleigh et al. |
| 2003/0072460 A1 | 4/2003 | Gonopolskiy et al. |
| 2003/0095667 A1 | 5/2003 | Watts |
| 2003/0099345 A1 | 5/2003 | Gartner et al. |
| 2003/0101048 A1 | 5/2003 | Liu |
| 2003/0103632 A1 | 6/2003 | Goubran et al. |
| 2003/0128851 A1 | 7/2003 | Furuta |
| 2003/0138116 A1 | 7/2003 | Jones et al. |
| 2003/0147538 A1 | 8/2003 | Elko |
| 2003/0169891 A1 | 9/2003 | Ryan et al. |
| 2003/0228023 A1 | 12/2003 | Burnett et al. |
| 2004/0013276 A1 | 1/2004 | Ellis et al. |
| 2004/0047464 A1 | 3/2004 | Yu et al. |
| 2004/0057574 A1 | 3/2004 | Faller |
| 2004/0078199 A1 | 4/2004 | Kremer et al. |
| 2004/0131178 A1 | 7/2004 | Shahaf et al. |
| 2004/0133421 A1 | 7/2004 | Burnett et al. |
| 2004/0165736 A1 | 8/2004 | Hetherington et al. |
| 2004/0196989 A1 | 10/2004 | Friedman et al. |
| 2004/0263636 A1 | 12/2004 | Cutler et al. |
| 2005/0025263 A1 | 2/2005 | Wu |
| 2005/0027520 A1 | 2/2005 | Mattila et al. |
| 2005/0049864 A1 | 3/2005 | Kaltenmeier et al. |
| 2005/0060142 A1 | 3/2005 | Visser et al. |
| 2005/0152559 A1 | 7/2005 | Gierl et al. |
| 2005/0185813 A1 | 8/2005 | Sinclair et al. |
| 2005/0213778 A1 | 9/2005 | Buck et al. |
| 2005/0216259 A1 | 9/2005 | Watts |
| 2005/0228518 A1 | 10/2005 | Watts |
| 2005/0276423 A1 | 12/2005 | Aubauer et al. |
| 2005/0288923 A1 | 12/2005 | Kok |
| 2006/0072768 A1 | 4/2006 | Schwartz et al. |
| 2006/0074646 A1 | 4/2006 | Alves et al. |
| 2006/0098809 A1 | 5/2006 | Nongpiur et al. |
| 2006/0120537 A1 | 6/2006 | Burnett et al. |
| 2006/0133621 A1 | 6/2006 | Chen et al. |
| 2006/0149535 A1 | 7/2006 | Choi et al. |
| 2006/0160581 A1 | 7/2006 | Beaugeant et al. |
| 2006/0165202 A1 | 7/2006 | Thomas et al. |
| 2006/0184363 A1 | 8/2006 | McCree et al. |
| 2006/0198542 A1 | 9/2006 | Benjelloun Touimi et al. |
| 2006/0222184 A1 | 10/2006 | Buck et al. |
| 2007/0021958 A1 | 1/2007 | Visser et al. |
| 2007/0027685 A1 | 2/2007 | Arakawa et al. |
| 2007/0033020 A1 | 2/2007 | (Kelleher) Francois et al. |
| 2007/0067166 A1 | 3/2007 | Pan et al. |
| 2007/0078649 A1 | 4/2007 | Hetherington et al. |
| 2007/0094031 A1 | 4/2007 | Chen |
| 2007/0100612 A1 | 5/2007 | Ekstrand et al. |
| 2007/0116300 A1 | 5/2007 | Chen |
| 2007/0150268 A1 | 6/2007 | Acero et al. |
| 2007/0154031 A1 | 7/2007 | Avendano et al. |
| 2007/0165879 A1 | 7/2007 | Deng et al. |
| 2007/0195968 A1 | 8/2007 | Jaber |
| 2007/0230712 A1 | 10/2007 | Belt et al. |
| 2007/0276656 A1 | 11/2007 | Solbach et al. |
| 2008/0019548 A1 | 1/2008 | Avendano |
| 2008/0033723 A1 | 2/2008 | Jang et al. |
| 2008/0140391 A1 | 6/2008 | Yen et al. |
| 2008/0201138 A1 | 8/2008 | Visser et al. |
| 2008/0228478 A1 | 9/2008 | Hetherington et al. |
| 2008/0260175 A1 | 10/2008 | Elko |
| 2009/0012783 A1 | 1/2009 | Klein |
| 2009/0012786 A1 | 1/2009 | Zhang et al. |
| 2009/0129610 A1 | 5/2009 | Kim et al. |
| 2009/0220107 A1 | 9/2009 | Every et al. |
| 2009/0228272 A1 | 9/2009 | Herbig et al. |
| 2009/0253418 A1 | 10/2009 | Makinen |
| 2009/0271187 A1 | 10/2009 | Yen et al. |
| 2009/0296958 A1 | 12/2009 | Sugiyama |
| 2009/0323982 A1 | 12/2009 | Solbach et al. |
| 2010/0094643 A1 | 4/2010 | Avendano et al. |
| 2010/0278352 A1 | 11/2010 | Petit et al. |
| 2011/0178800 A1 | 7/2011 | Watts |
| 2011/0182436 A1 | 7/2011 | Murgia et al. |
| 2012/0093341 A1 | 4/2012 | Kim et al. |
| 2012/0121096 A1 | 5/2012 | Chen et al. |
| 2012/0140917 A1 | 6/2012 | Nicholson et al. |

FOREIGN PATENT DOCUMENTS

| | | |
|---|---|---|
| JP | 4184400 | 7/1992 |
| JP | 5053587 | 3/1993 |
| JP | 2005172865 | 7/1993 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004010415 | 1/2004 |
| WO | 2007/081916 | 7/2007 |
| WO | 2007/140003 | 12/2007 |
| WO | 2010/005493 | 1/2010 |
| WO | 2011094232 | 8/2011 |

OTHER PUBLICATIONS

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. "Acoustic Noise Suppression Using Regression Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, Lloyd A. et al. "A Place Theory of Sound Localization," Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.

Kates, James M. "A Time-Domain Digital Cochlear Model", IEEE Transactions on Signal Processing, Dec. 1991, vol. 39, No. 12, pp. 2573-2592.

Lazzaro, John et al., "A Silicon Model of Auditory Localization," Neural Computation Spring 1989, vol. 1, pp. 47-57, Massachusetts Institute of Technology.

Lippmann, Richard P. "Speech Recognition by Machines and Humans", Speech Communication, Jul. 1997, vol. 22, No. 1, pp. 1-15.

Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.

Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.

Martin, Rainer "Spectral Subtraction Based on Minimum Statistics", in Proceedings Europe. Signal Processing Conf., 1994, pp. 1182-1185.

Mitra, Sanjit K. Digital Signal Processing: a Computer-based Approach. 2nd Ed. 2001. pp. 131-133.

Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.

Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.

Watts, Lloyd Narrative of Prior Disclosure of Audio Display on Feb. 15, 2000 and May 31, 2000.

Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.

Parra, Lucas et al. "Convolutive Blind Separation of Non-Stationary Sources", IEEE Transactions on Speech and Audio Processing. vol. 8, No. 3, May 2008, pp. 320-327.

Rabiner, Lawrence R. et al. "Digital Processing of Speech Signals", (Prentice-Hall Series in Signal Processing). Upper Saddle River, NJ: Prentice Hall, 1978.

Weiss, Ron et al., "Estimating Single-Channel Source Separation Masks: Revelance Vector Machine Classifiers vs. Pitch-Based Masking", Workshop on Statistical and Perceptual Audio Processing, 2006.

Schimmel, Steven et al., "Coherent Envelope Detection for Modulation Filtering of Speech," 2005 IEEE International Conference on Acoustics, Speech, and Signal Processing, vol. 1, No. 7, pp. 221-224.

Slaney, Malcom, "Lyon's Cochlear Model", Advanced Technology Group, Apple Technical Report #13, Apple Computer, Inc., 1988, pp. 1-79.

Slaney, Malcom, et al. "Auditory Model Inversion for Sound Separation," 1994 IEEE International Conference on Acoustics, Speech and Signal Processing, Apr. 19-22, vol. 2, pp. 77-80.

Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.

Solbach, Ludger "An Architecture for Robust Partial Tracking and Onset Localization in Single Channel Audio Signal Mixes", Technical University Hamburg-Harburg, 1998.

Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.

Syntrillium Software Corporation, "Cool Edit User's Manual", 1996, pp. 1-74.

Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).

Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.

Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28,-Oct. 2, 2004, Sendai, Japan. pp. 2123-2128.

Watts, Lloyd, "Robust Hearing Systems for Intelligent Machines," Applied Neurosystems Corporation, 2001, pp. 1-5.

Widrow, B. et al., "Adaptive Antenna Systems," Proceedings of the IEEE, vol. 55, No. 12, pp. 2143-2159, Dec. 1967.

Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.

International Search Report dated Jun. 8, 2001 in Application No. PCT/US01/08372.

International Search Report dated Apr. 3, 2003 in Application No. PCT/US02/36946.

International Search Report dated May 29, 2003 in Application No. PCT/US03/04124.

International Search Report and Written Opinion dated Oct. 19, 2007 in Application No. PCT/US07/00463.

International Search Report and Written Opinion dated Apr. 9, 2008 in Application No. PCT/US07/21654.

International Search Report and Written Opinion dated Sep. 16, 2008 in Application No. PCT/US07/12628.

International Search Report and Written Opinion dated Oct. 1, 2008 in Application No. PCT/US08/08249.

International Search Report and Written Opinion dated May 11, 2009 in Application No. PCT/US09/01667.

International Search Report and Written Opinion dated Aug. 27, 2009 in Application No. PCT/US09/03813.

International Search Report and Written Opinion dated May 20, 2010 in Application No. PCT/US09/06754.

Fast Cochlea Transform, US Trademark Reg. No. 2,875,755 (Aug. 17, 2004).

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al. "Efficient Non-Uniform Time-Scaling of Speech With WSOLA for CALL Applications", Proceedings of InSTIL/

ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

Fazel et al., An overview of statistical pattern recognition techniques for speaker verification, IEEE, May 2011.

Sundaram et al, Discriminating two types of noise sources using cortical representation and dimension reduction technique, IEE, 2007.

Bach et al, Learning Spectral Clustering with application to speech separation, Journal of machine learning research, 2006.

International Search Report and Written Opinion dated Mar. 31, 2011 in Application No. PCT/US11/22462.

* cited by examiner

SYSTEM AND METHOD FOR ENVELOPE-BASED ACOUSTIC ECHO CANCELLATION

CROSS-REFERENCE TO RELATED APPLICATION

The present application is related to U.S. patent application Ser. No. 12/004,899 filed Dec. 21, 2007 and entitled "System and Method for 2-Channel and 3-Channel Acoustic Echo Cancellation," and U.S. patent application Ser. No. 12/004,896 filed Dec. 21, 2007 and entitled "System and Method for Blind Subband Acoustic Echo Cancellation Postfiltering," both of which are herein incorporated by reference.

The present application is also related to U.S. patent application Ser. No. 11/825,563 filed Jul. 6, 2007 and entitled "System and Method for Adaptive Intelligent Noise Suppression," U.S. patent application Ser. No. 11/343,524, filed Jan. 30, 2006 and entitled "System and Method for Utilizing Inter-Microphone Level Differences for Speech Enhancement," and U.S. patent application Ser. No. 11/699,732 filed Jan. 29, 2007 and entitled "System And Method For Utilizing Omni-Directional Microphones For Speech Enhancement," all of which are also herein incorporated by reference.

BACKGROUND OF THE INVENTION

1. Field of Invention

The present invention relates generally to audio processing and, more particularly, to envelope-based acoustic echo cancellation in an audio system.

2. Description of Related Art

Conventionally, when audio from a far-end environment is presented through a speaker of a near-end communication device, sounds from a far-end audio signal may be picked up by microphones or other audio sensors of the near-end communication device. As such, the sounds from the far-end audio signal may be sent back to the far-end environment resulting in an echo to a far-end listener.

Conventionally, acoustic echo cancellation (AEC) systems may take the far-end audio signal and use it to predict the echo of the far-end audio signal (after being played through the speaker and picked up by the microphone). Typically, a transfer function that describes a path from the far-end audio signal, through the speaker, through an acoustic environment, and back to the microphone is linearly modeled to predict the echo. These AEC systems are performed in a waveform domain whereby the echo is predicted, inverted, delayed, and subtracted out from a near-end audio signal.

Disadvantageously, there are many problems with these conventional AEC systems. First, the transfer function (i.e., relationship between the far-end audio signal and the echo) is typically constantly changing, since the acoustic environment is rarely fixed. In the case of a handheld communication device (e.g., a cellular phone), there may also be reflections off a face of a user. The prior art AEC systems are adaptive and continually update the transfer function. However, errors usually occur in the echo prediction due to the changing environment. If the echo prediction is even slightly incorrect, or an applied delay is incorrect, residual echo will remain.

A second disadvantage is that these prior art AEC systems typically use a linear model (i.e., linear filter) to predict the echo. However, the transfer function is often not linear (e.g., if there are non-linearities in the speaker which may cause distortion). As a result, poor echo prediction may occur.

Other AEC systems may attempt to overcome this disadvantage by introducing non-linearity to the echo prediction model. However, this results in more complexity. For example, non-linearity may become problematic in cellular phones or speakerphones with cheap components. The prediction may be difficult to obtain unless an exact model of the speaker (e.g., of the cellular phone or speakerphone) is known.

SUMMARY OF THE INVENTION

Embodiments of the present invention overcome or substantially alleviate prior problems associated with acoustic echo cancellation processing. Exemplary embodiments of the present invention utilize magnitude envelopes of acoustic signals to determine an echo envelope. An echo gain mask may then be generated based on the echo envelope.

In exemplary embodiments, a primary acoustic signal is received via a microphone of the communication device, and a far-end signal is received via a receiver. Because a speaker may provide audio (the far-end signal) that may be picked up by the microphone, the acoustic signal received by the microphone may include speaker leakage. As such, acoustic echo cancellation (AEC) is applied to the acoustic signal to obtain an AEC masked signal.

Frequency analysis is performed on the primary acoustic signal and the far-end acoustic signal to obtain frequency sub-bands. These frequency sub-bands may then be used to generate corresponding estimated energy spectra. The energy spectra are then used to determine echo-dominated and echo-free noise estimates.

An echo gain mask based on magnitude envelopes of the energy spectra of the primary and far-end acoustic signals for each frequency sub-band is generated. A noise gain mask based on at least the primary acoustic signal for each frequency sub-band may also be generated. The echo gain mask and the noise gain mask may then be combined. In one embodiment, the combination comprises selecting a minimum between the two gain masks. The combination of the echo gain mask and noise gain mask may then be applied to the primary acoustic signal to generate a masked signal, which may be output to a far-end environment.

DESCRIPTION OF EXEMPLARY EMBODIMENTS

The present invention provides exemplary systems and methods for providing envelope-based acoustic echo cancellation (EnvAEC). Exemplary embodiments perform the EnvAEC based on frequency sub-bands and prediction envelopes of echo waveforms, as opposed to details of actual echo waveforms. The envelopes, thus, show how energy in the waveforms may change over time.

Exemplary embodiments are configured to reduce and/or minimize effects of speaker signal leakage to one or more microphones in such a way that the far-end environment does not perceive an echo. While the following description will be discussed using a two microphone system, it should be noted that embodiments of the present invention may be applied to a single microphone envelope-based acoustic echo cancellation system.

Embodiments of the present invention may be practiced on any device that is configured to receive audio such as, but not limited to, cellular phones, phone handsets, headsets, and conferencing systems. While embodiments of the present invention will be described in reference to operation on a speakerphone, the present invention may be practiced on any audio device.

Figure 1:
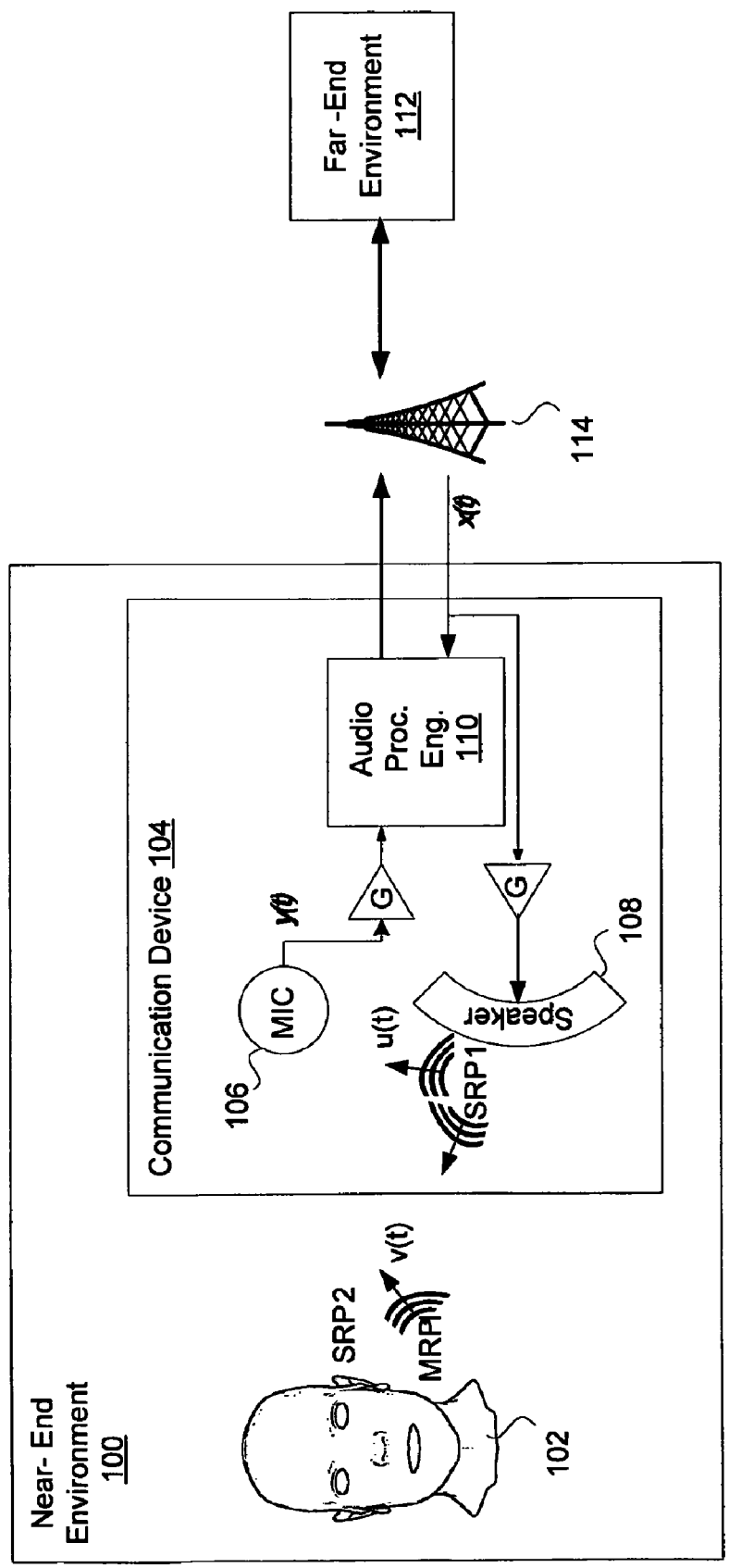
FIG. 1 is an environment in which embodiments of the present invention may be practiced.

Referring to FIG. 1, environments in which embodiments of the present invention may be practiced is shown. A user in a near-end environment 100 acts as an acoustic source 102 to a communication device 104. In some embodiments, a mouth of the user comprises a point near a mouth of the acoustic source 102, while a speaker comprises a point near an ear of the acoustic source 102.

The exemplary communication device 104 comprises a microphone 106 (i.e., primary microphone), speaker 108, and an audio processing system 110 including an acoustic echo cancellation mechanism. The microphone 106 is configured to pick up audio from the acoustic source 102, but may also pick up noise from the near-end environment 100. The audio received from the acoustic source 102 will comprise a near-end microphone signal y(t), which will be sent back to a far-end environment 112.

In some embodiments, one or more additional microphones (not shown) may be present in the communication device 104. The one or more additional microphones may be located a distance away from the primary microphone 106. In some embodiments, the microphone(s) may comprise omni-directional microphones.

An acoustic signal x(t) comprising speech from the far-end environment 112 may be received via a communication network 114 by the communication device 104. The received acoustic signal x(t) may then be provided to the near-end environment 100 via the speaker 108. The audio output from the speaker 108 may leak back into (i.e., be picked up by) the microphone 106. This leakage may result in an echo perceived at the far-end environment 112.

The exemplary audio processing system 110 is configured to remove u(t) (i.e., echoes of x(t)) from y(t), while preserving a near-end voice signal v(t). In exemplary embodiments, the removal of u(t) is performed without introducing distortion to a far-end listener. This may be achieved by calculating and applying time and frequency varying multiplicative gains or masks that render the acoustic echo inaudible. Ideally, the gains are less than 1 (i.e., less than 0 dB) to result in signal attenuation. In various embodiments, the attenuation is strong when echo dominates over other components of the signal.

Figure 2:
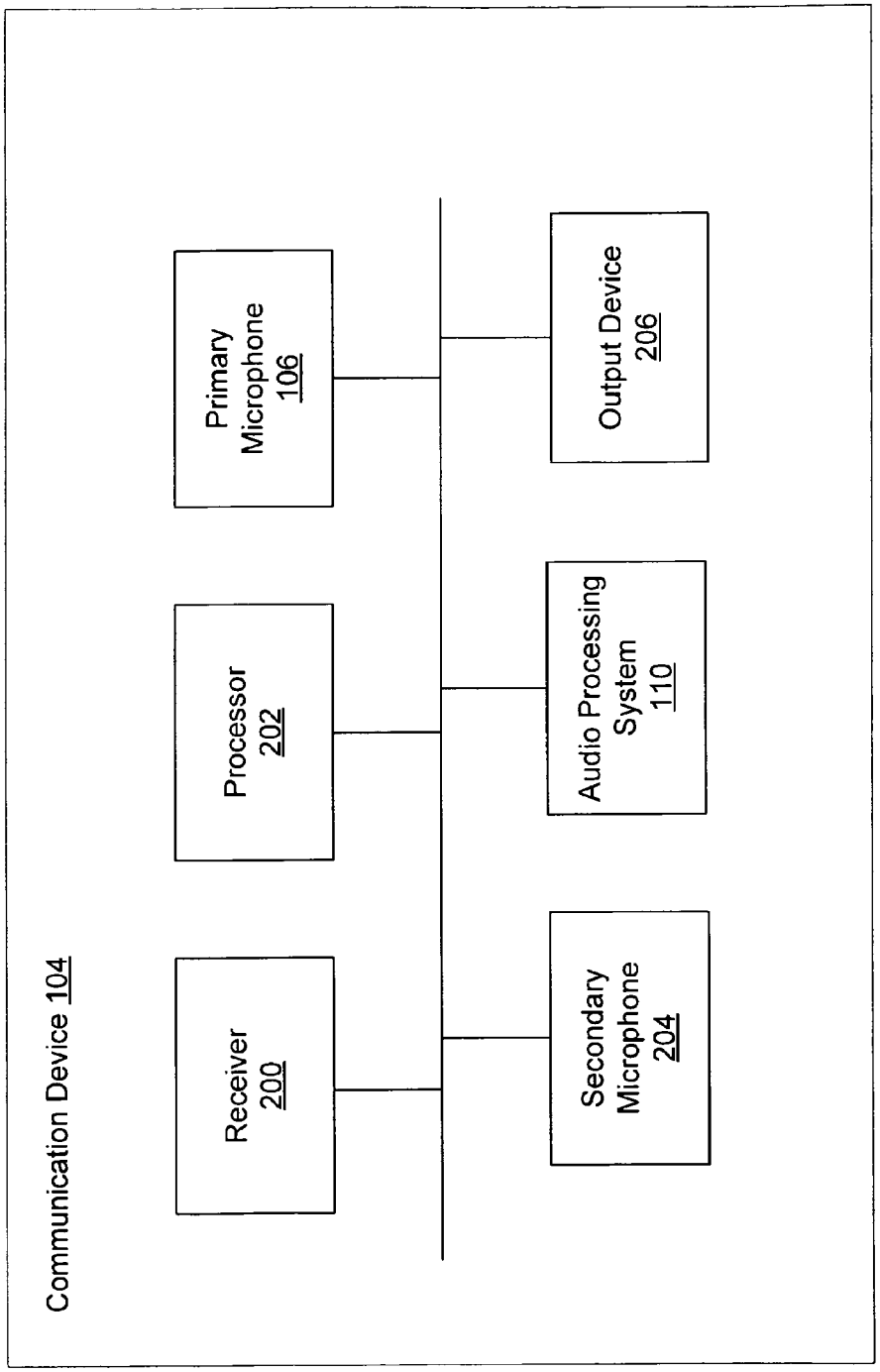
FIG. 2 is a block diagram of an exemplary communication device implementing embodiments of the present invention.

Referring now to FIG. 2, the exemplary communication device 104 is shown in more detail. In exemplary embodiments, the communication device 104 is an audio receiving device that comprises a receiver 200, a processor 202, the primary microphone 106, an optional secondary microphone 204, the audio processing system 110, and an output device 206. The communication device 104 may comprise more or other components necessary for communication device 104 operations. Similarly, the communication device 104 may comprise fewer components that perform similar or equivalent functions to those depicted in FIG. 2.

The exemplary receiver 200 is an acoustic sensor configured to receive the far-end signal x(t) from the network 114. In some embodiments, the receiver 200 may comprise an antenna device. The received far-end signal x(t) may then be forwarded to the audio processing system 110 and the output device 206.

The audio processing system 110 is also configured to receive the acoustic signals from the acoustic source 102 via the primary and optional secondary microphones 106 and 204 (e.g., primary and secondary acoustic sensors) and process the acoustic signals. The primary and secondary microphones 106 and 204 may be spaced a distance apart in order to allow for an energy level differences between them. After reception by the microphones 106 and 204, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 204 is herein referred to as the secondary acoustic signal. It should be noted that embodiments of the present invention may be practiced utilizing any number of microphones. In exemplary embodiments, the acoustic signals from the secondary microphone 204 are used for total noise estimation as will be discussed further below.

The output device 206 is any device which provides an audio output to a listener (e.g., the acoustic source 102). For example, the output device 206 may comprise the speaker 108, an earpiece of a headset, or handset on the communication device 104.

In various embodiments, where the primary and secondary microphones are omni-directional microphones that are closely-spaced (e.g., 1-2 cm apart), a beamforming technique may be used to simulate a forwards-facing and a backwards-facing directional microphone response. A level difference may be obtained using the simulated forwards-facing and the backwards-facing directional microphone. The level difference may be used to discriminate speech and noise in the time-frequency domain which can be used in noise estimation.

Figure 3:
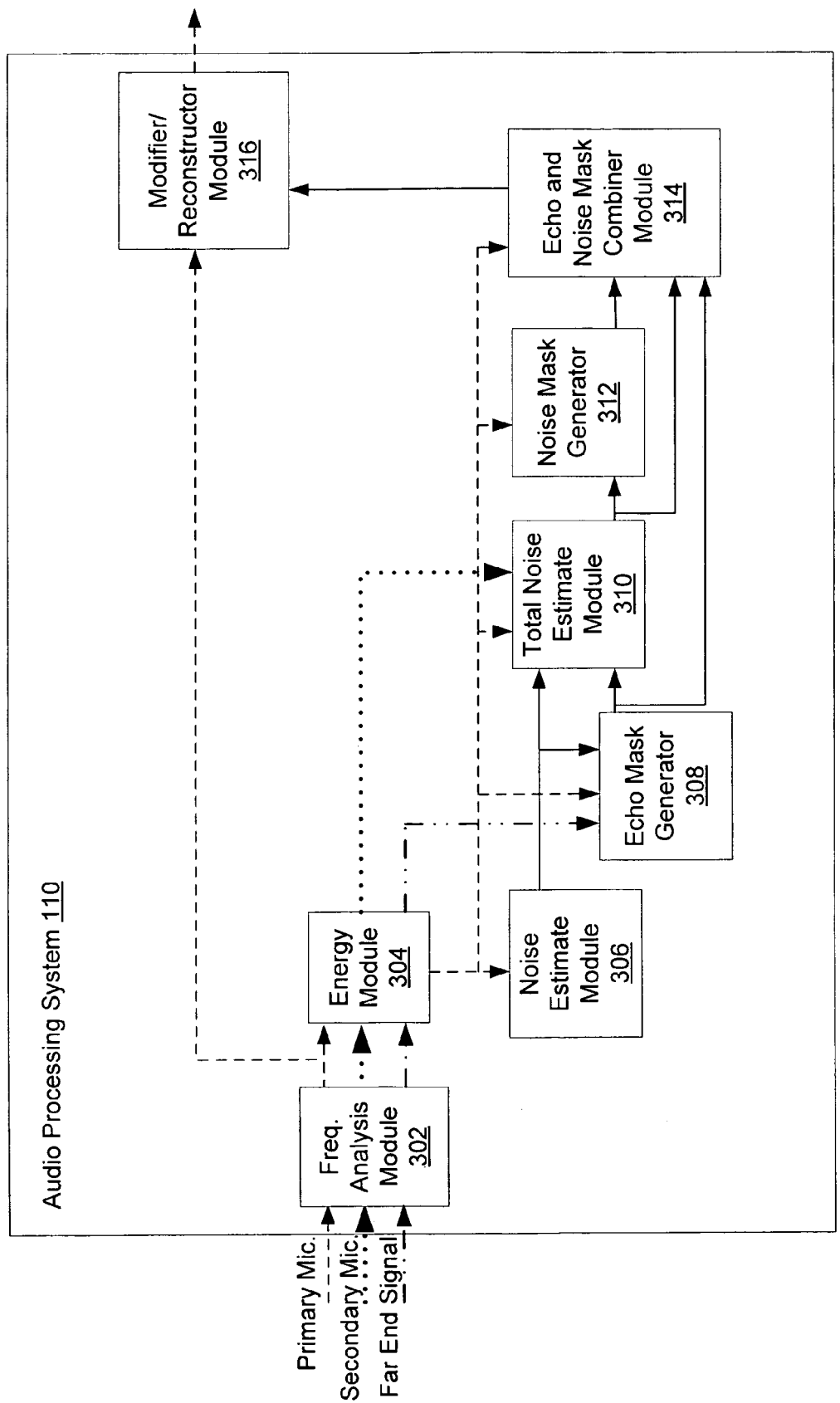
FIG. 3 is a block diagram of an exemplary audio processing system.

FIG. 3 is a detailed block diagram of the exemplary audio processing system 110, according to exemplary embodiments of the present invention. In exemplary embodiments, the audio processing system 110 may be embodied within a memory device. The exemplary audio processing system 110 provides acoustic echo cancellation (AEC) and noise suppression. As a result, an acoustic signal sent from the communication device 104 to the far-end environment 112 comprises noise suppression as well as reduced or eliminated echo from speaker leakage. In accordance with one embodiment, the audio processing system 110 may comprise a frequency analysis module 302, an energy module 304, a noise estimate module 306, an echo mask generator 308, a total noise estimate module 310, a noise mask generator 312, an echo and noise mask integration module 314, and a modifier/reconstructor module 316.

In operation, the acoustic signals received from the primary and secondary microphones 106 and 204 and the far-end acoustic signal x(t) are converted to electric signals and processed through the frequency analysis module 302. The frequency analysis module 302 takes the acoustic signals and mimics the frequency analysis of the cochlea (i.e., cochlear domain) simulated by a filter bank. In one embodiment, the frequency analysis module 302 separates the acoustic signals into frequency bands or sub-bands. Alternatively, other filters such as short-time Fourier transform (STFT), Fast Fourier Transform, Fast Cochlea transform, sub-band filter banks, modulated complex lapped transforms, cochlear models, a gamma-tone filter bank, wavelets, or any generalized spectral analysis filter/method, can be used for the frequency analysis and synthesis.

Because most sounds (e.g., acoustic signals) are complex and comprise more than one frequency, a sub-band analysis on the acoustic signal may be performed to determine what individual frequencies are present in the acoustic signal during a frame (e.g., a predetermined period of time). According to one embodiment, the frame is 5-20 ms long (e.g., 40 to 160 samples for a system audio sampling rate of 8000 Hz). Alternative embodiments may utilize other frame lengths. Data may be pushed through the audio processing system 110 in these frames (i.e., blocks of buffered samples).

The output of the frequency analysis module 302 comprises a plurality of waveforms. Thus, if the acoustic signal comprises high frequency bands, the resulting waveforms are more energetic. As will be discussed further below, the envelopes of these waveforms in these frequency bands are analyzed for echo suppression. Specifically, the envelopes of the far-end acoustic signal are used to predict the echo envelopes that will be present in the near-end acoustic signal (e.g., primary acoustic signal).

Once the frequencies are determined, the signals are forwarded to the energy module 304 which computes energy/power estimates for the primary, secondary, and far-end acoustic signals during an interval of time for each frequency sub-band (i.e., power estimates). As such an average power output for each frequency sub-band (i.e., power spectrum) may be calculated for each of the acoustic signals in frames. In exemplary embodiments, the frames comprise 5 ms time periods. Thus, buffers are filled up with 5 ms of frequency analysis module 302 output. An average power per frame may then be determined.

The exemplary energy module 304 is a component which, in some embodiments, can be represented mathematically by the following equation:

$$E(t,\omega)=\lambda_E|X(t,\omega)|^2+(1-\lambda_E)E(t-1,\omega)$$

where $\lambda_E$ is a number between zero and one that determines an averaging time constant, $X(t,\omega)$ is the acoustic signal being processed (e.g., the primary, secondary, or far-end acoustic signal) in the cochlea domain, $\omega$ represents the frequency, and t represents time. Given a desired time constant T (e.g., 4 ms) and sampling frequency $f_s$ (e.g., 16 kHz), the value of $\lambda_E$ can be approximated as $$\lambda_E = 1 - e^{-\frac{1}{Tf_s}}$$

As provided, the energy level for the acoustic signal, $E(t,\omega)$, is dependent upon a previous energy level of the acoustic signal, $E(t-1,\omega)$.

The exemplary noise estimate module 306 is configured to determine a noise estimate based on the primary acoustic signal. In some embodiments, this noise estimate module 306 may produce a stationary noise estimate based on constant ambient noise in the near-end environment 100. This stationary noise estimate may be later augmented by non-stationary noise components as a function of both the primary microphone 106 and the optional secondary microphone 204.

In one embodiment, the noise estimate module 306 comprises a minimum statistics tracker (MST) which receives the energy of the primary acoustic signal from the signal path for processing. The determination of the noise estimate, according to one embodiment, is discussed in more detail in connection with U.S. patent application Ser. No. 12/072,931 entitled "System and Method for Providing Single Microphone Noise Suppression Fallback," which is incorporated by reference. The noise estimate is then provided to the echo mask generator 308 and the total noise estimate module 310.

The exemplary echo mask generator 308 is configured to generate an echo gain mask that will render echo inaudible. The echo gain mask is generated based on predicted envelopes (of the echo waveforms) based on the far-end acoustic signal. By analyzing the near-end signal (e.g., primary acoustic signal) and the predicted envelopes, a determination may be made as to where and when echo may be audible in frequency sub-bands. Echo suppression may then be applied to these frequency sub-bands. The output of the echo mask generator 308 comprises a gain value per frequency sub-band and frame. The echo mask generator 308 will be discussed in more detail in connection with FIG. 4.

The result of the echo mask generator 308 along with the noise estimate and the optional secondary acoustic signal energy are forwarded to the total noise estimate module 310. In some embodiments, the total noise estimate module 310 may comprise an echo-free noise estimate module. The total noise estimate module 310 is configured to compute an estimate of the near-end noise power spectra (e.g., time and frequency dependent portion of the acoustic signal that is not from the acoustic source 102). In exemplary embodiments, the total noise estimate module 310 refines the noise estimate received from the noise estimate module 306, which may be corrupted by echo power.

The results from the total noise estimate module 310 may then be used by the noise mask generator 312 to determine a noise suppression gain mask. Various embodiments of the exemplary total noise estimate module 310 and the exemplary noise mask generator 312 are further discussed in U.S. patent application Ser. No. 12/004,899 filed Dec. 21, 2007 and entitled "System and Method for 2-Channel and 3-Channel Acoustic Echo Cancellation," and U.S. patent application Ser. No. 12/004,896 filed Dec. 21, 2007 and entitled "System and Method for Blind Subband Acoustic Echo Cancellation Post-filtering" which are both hereby incorporated by reference.

In some embodiments, the echo gain mask may be refined in each sub-band to reduce near-end speech distortion. In exemplary embodiments, the echo and noise mask integration module 314 takes into account the near-end noise level (from the echo-free noise estimate determined by the total noise estimate module 310) and the noise suppression gain mask (from the noise mask generator 312). In various embodiments, the echo gain mask may be limited such that a total output power is not more than a certain amount (e.g., 6 dB) below the output noise power that will be produced by applying the noise suppression gain mask to the near-end noise. This process may reduce perception of, output noise modulation correlated with the echo, while still ensuring the echo remains inaudible.

The echo gain mask is combined with the noise gain mask by the echo and noise mask integration module 314. In one embodiment, the echo and noise mask integration module 314 may select a minimum between the two gain masks (i.e., noise gain mask and echo gain mask) for each sub-band, with a lower limit on how far below the noise gain mask the combined mask can be. A possible mathematical description of this combination operation is:

$$g_{tot} = \min(g_N, \max(g_E, g_N \cdot \sqrt{Pn/Py} \cdot \gamma)),$$

where $g_{tot}$ is a final gain mask, min(x,y) is a minimum of x and y, max(x,y) is a maximum of x and y, $g_N$ is the noise gain mask, $g_E$ is the echo gain mask, Py is the total power in the frame, Pn is the estimated noise power in the frame, and γ is maximum tolerated modulation on the output noise. For example, if the amount of tolerated modulation is −6 dB (i.e., 6 dB down), γ will equal $10^{-6/20}$ or around 0.5.

The noise gain mask is produced from the total noise estimate and may be defined such that the noise power is reduced at the system output but not rendered completely inaudible. As such, the echo and noise mask integration module 314 may be used to negotiate different objectives of the noise suppression and echo cancellation masks. Furthermore, it should be noted that the final gain mask may be defined such that no noise reduction, or at least multiplicative noise masking, is performed in the system. This is equivalent to taking the noise mask generator 312 out of the audio processing system 110. The result is a final gain mask that may be used for modification of the primary acoustic signal from the primary microphone 106. Accordingly in exemplary embodiments, gain masks may be applied to an associated frequency band of the primary acoustic signal in the modifier/reconstructor module 316.

Next, the post-AEC and noise suppressed frequency bands are converted back into time domain from the cochlea domain. The conversion may comprise taking the post-AEC and noise suppressed frequency bands and adding together phase shifted signals of the cochlea channels in the modifier/reconstructor module 316. In one embodiment, the reconstruction portion of the modifier/reconstructor module 316 comprises a frequency synthesis module. Once conversion is completed, the synthesized, masked acoustic signal may be output (e.g., forwarded to the communication network 114 and sent to the far-end environment 112).

In the embodiment of FIG. 3, the stationary and non-stationary noise estimates are calculated separately. This architecture is advantageous in situations where cues being used to estimate the non-stationary noise components are not able to discriminate echo from ambient noise. In these situations, the input into the echo mask generator 308 may cause an adaptation control module to incorrectly freeze adaptation, as will be described further in connection with FIG. 4. Thus, it may be desirable to utilize noise estimation components, such as stationary noise, that are not likely to be strongly corrupted by the echo in the echo mask generator 308. Subsequently, since the echo mask generator 308 output indicates frames and frequencies where echo dominates, the output may be taken into account for a "total noise estimate" operation. One example of this is to freeze update of the noise estimate when the echo mask indicates echo is dominating the signal.

It should be noted that the system architecture of the audio processing system 110 of FIG. 3 is exemplary. Alternative embodiments may comprise more components, fewer components, or equivalent components and still be within the scope of embodiments of the present invention.

Figure 4:
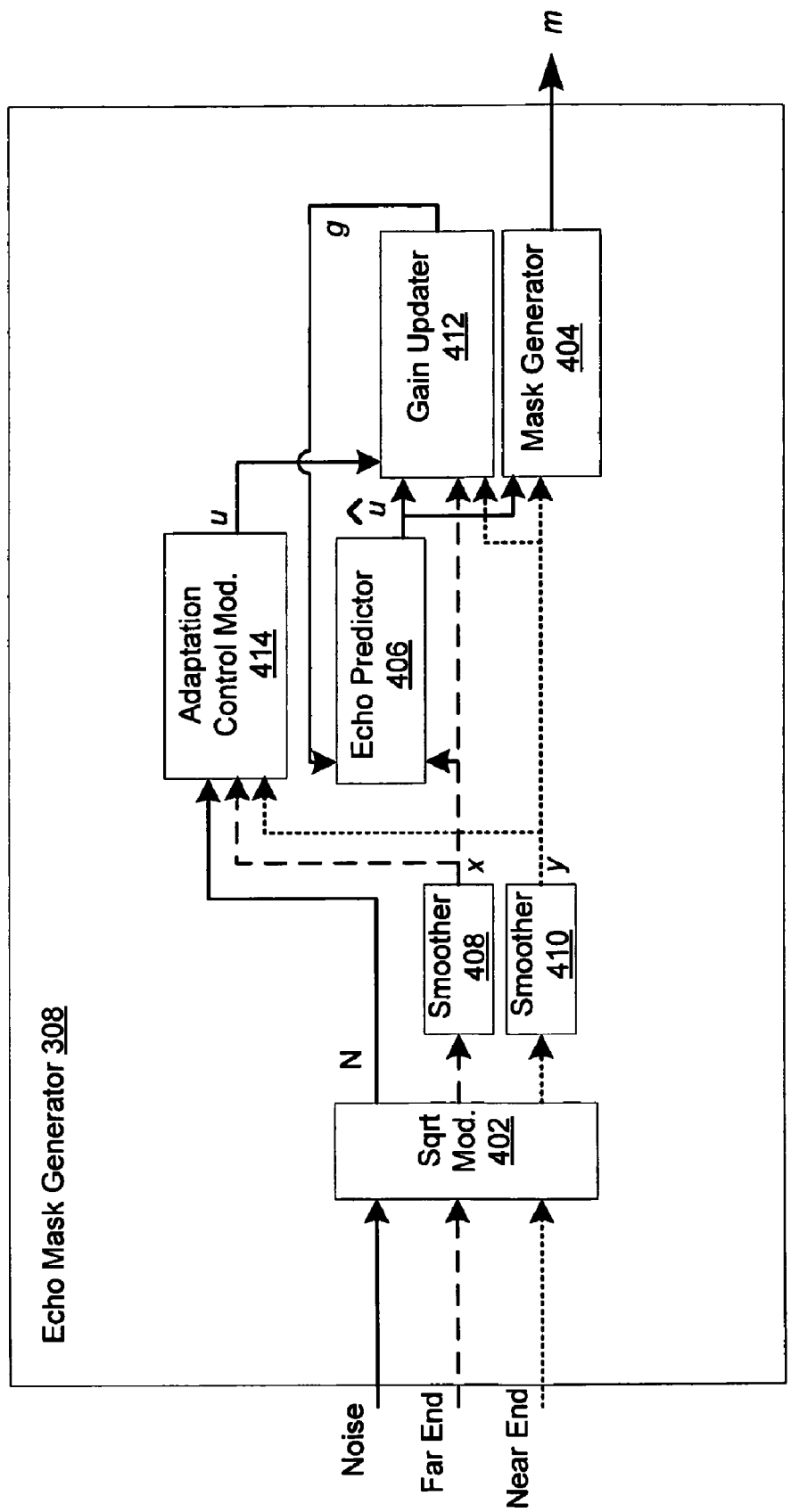
FIG. 4 is a block diagram of an echo mask generator.

Referring now to FIG. 4, a block diagram of the echo mask generator 308 is shown. The echo mask generator 308 is configured to generate an echo gain mask which will attenuate a far-end echo (ideally to render the far-end echo inaudible) while minimizing disturbance of near-end sources. In exemplary embodiments, the echo mask generator 308 receives as inputs per frame a power spectra of the near-end signal (e.g., primary acoustic signal), a power spectra of the far-end signal, and, optionally, a noise power spectrum estimate from the noise estimate module 306.

The inputs are then subjected to a square-root (sqrt) operation in the sqrt module 402. The sqrt operation transforms the power spectrum into magnitudes. For a given frequency band, a sequence of such magnitudes over time comprises an envelope, or one amplitude per frame.

In exemplary embodiments, a prediction of an echo in a near-end envelope is used to determine whether the near-end envelope is dominated by echo to a point that the echo is audible. The prediction may be based on the far-end signal (and thus the far-end envelope). For example, if there is no energy in the far-end envelope, there is likely no echo and thus no echo suppression. However, if there is energy both in the far-end and the near-end envelopes, an echo within the near-end envelopes is more likely. In these examples, echo suppression will be applied. The echo mask generator 308 comprises logic which analyzes the prediction versus an observation in order to determine where and when to apply echo suppression.

In some embodiments, the amount of echo suppression may be limited by perceptual effects. For example, if a loud sound is followed by a soft sound in quick succession, forward masking may occur whereby the soft sound is not really perceived. In this situation, suppression may not be necessary.

The determination of whether the near-end envelope is dominated by echo may occur in a mask generator 404. If the echo is audible, the mask generator 404 will have a low gain value (e.g., 0). Otherwise, the mask generator 404 may have an "all pass" gain value (e.g., 1). A mathematical representation of this determination is $$m = H\left[\frac{y^2 - \hat{u}^2}{\hat{u}^2} - \tau_1\right], \quad (1)$$

where m is the mask generated by the mask generator 404, y is the near-end envelope, û is the echo prediction, $\tau_1$ is a dominance threshold for a ratio of non-echo power to echo power, and H is a Heavyside step function (which is 1 if its input is greater than 1 and 0 otherwise). A reasonable value for $\tau_1$, for example, is 1 (0 dB). The lower $\tau_1$ is, the higher the echo power has to be relative to the total power before it is attenuated.

An echo predictor 406 is configured to use the far-end envelope (per frequency band) to predict its echo in the near-end envelope. In one embodiment, the echo predictor 406 may be simplified by assuming that the echo envelope is just a delayed and scaled version of the far-end envelope. Mathematically, this assumption may be represented by $$\hat{u}(n) = g \cdot x(n-d), \quad (2)$$

where g is a scale factor, n is a frame index, and d is a number of frames delayed. In some embodiments, this representation may provide an accurate estimate due to low temporal resolution of the envelope (which is bolstered by smoothing). This allows the prediction to be robust to changes in the delay and echo tail length. Often, the number of frames delayed d can be measured and stored as a priori information. In other embodiments, d may be estimated during operation (e.g., by finding a peak of a cross-correlation between the near-end and far-end signals).

It may also be possible to extend the prediction to a multiple reflection model, such as $$\hat{u}(n) = \sum_d g(d) \cdot x(n-d), \quad (3)$$

where the echo is predicted as a summation of far-end echoes at various delays and scale factors. However, in most embodiments, such an extreme model may not be necessary.

Smoothers 408 and 410 may smooth the magnitudes, and thus envelopes, of the far-end and near-end signals. The temporal smoothing removes "wiggles" in the envelope that may not be important for echo suppression. These "wiggles" if not removed, may result in glitches in the echo prediction. As a result, low temporal resolution can be further enforced by applying the temporal smoothing to the envelopes. An example of a simple form of smoothing is a leaky integrator, mathematically represented by, $$x(n) = \alpha \cdot x(n-1) + (1-\alpha) \cdot X(n), \quad (4)$$

where $\alpha$ is a smoothing factor and x is an unsmoothed envelope. In this embodiment, more smoothing is performed at higher $\alpha$. As a result, the system may be less susceptible to delay and echo tail changes.

Smoothing may also be beneficial for filtering out hard-to-predict non-linear interactions (e.g., "cross-terms") between the echo and other near-end signal components inconsequential to determining echo dominance. However, if too much smoothing is performed, the system may not react quickly enough for echo dynamics. An example of a reasonable value for $\alpha$ is 0.85 for a frame rate of 200 Hz, which corresponds to a time constant of around $-200/\ln(0.85)=30$ ms. For this value, the system is able to accurately predict the echo envelope, even if the echo tail is up to 600 ms long.

Exemplary embodiments are robust to changes in echo delay and tail length. As such, the accuracy of the echo prediction will be largely determined by the accuracy of the gain g. In most embodiments, this gain g may not be known a priori with enough precision, and so it must be estimated during operation. Further, complicating matters, g can significantly change at any time due to echo path or speaker volume changes.

Thus, embodiments of the present invention adaptively estimate g using a gain updater 412. In some embodiments, g is updated quickly when echo is dominating the near-end signal, and updated slowly or not at all otherwise. In exemplary embodiments, an adaptation control module 414 provides the information necessary to determine how quickly to update g. In some embodiments, the information may come in a form of a frame- and frequency-varying parameter $\mu$. The larger $\mu$ is, the faster g is updated.

Given $\mu$, an efficient way of updating g is given by a normalized least-mean-square (NLMS) algorithm, such as, $$g_d(n+1) = g_d(n) + \frac{\mu \cdot x_d \cdot (y - \hat{u})}{x_d^2 + \Delta}, \quad (5)$$

where $x_d = x(n-d)$. d subscripts denote that the expression is valid for an a priori known delay d.

If a vector of delays is being considered in conjunction with the prediction model (3), there may be well known and simple extensions to Eq. (5) that apply. Additionally, $\Delta$ is a regularization parameter that slows the update of g when the far-end signal is small. Eq. (5) may be re-written, using (2), as $$g_d(n+1) = (1-\mu\beta) \cdot g_d(n) + \mu\beta \cdot \frac{y}{x}, \quad (6)$$

where $$\beta = \frac{x^2}{x^2 + \Delta}$$

is between 0 and 1. Eq. (6) gives an intuitive explanation that the gain estimate is an adaptively smoothed version of a ratio of near-end to far-end envelopes. The output of the gain updater 412 may be fed back to the echo predictor 406 in the next frame. It should be noted that if any upper or lower limits on g are known a priori, these limits may be applied before passing the result to the echo predictor 406.

The exemplary adaptation control module 414 is configured to notify the gain updater 412 when and how fast to safely adapt the gain g via the parameter $\mu$ (which is between 0 and 1 with 1 being the fastest). In exemplary embodiments, a determination of when the echo sufficiently dominates the near-end signal (e.g., when the ratio y/x in Eq. (6) is a meaningful observation of g) is performed. The output of the adaptation control module 414 encapsulates an adaptation speed.

In accordance with some embodiments, multiple cues may be utilized to help strike a balance between updating too quickly (e.g., the system reacts erroneously to near-end sources) and updating too slowly (e.g., the system doesn't react quickly enough to echo path changes). The cues may comprise, for example, adaptive far-end noise floor, near-end noise floor, and maximum gain. While these examples, as will be discussed below, provide outputs of either 0 or 1, alternative cues can produce values between 0 and 1.

The adaptive far-end floor cue is an adaptive version of the $\Delta$ in Eq. (5) (i.e., an adaptive threshold on the far-end energy). As a result, only the most powerful times and frequencies of x enable fast adaptation, since the echo is most likely to dominate where x is its most powerful. One method of insuring this result is by performing a long-term average/smoothing of past values of x, and then determining whether or not the current value of x is far enough above the long term average $x_{LT}$.

Besides smoothing (e.g., Eq. (4)), an alternative method to produce $x_{LT}$ is to convert x to decibel units and apply a linear slew rate. This may be mathematically represented by, $$x_{LT}(n+1) = \begin{cases} x_{LT}(n) + \gamma_{up}; & dB[x(n)] > x_{LT}(n) \\ x_{LT}(n) - \gamma_{down}; & dB[x(n)] \leq x_{LT}(n) \end{cases},$$

where dB[x] denotes a conversion of x to dB units. This method may result in smoother tracking behavior. Furthermore, independent control of upward and downward slew rates via $\gamma_{up}$ and $\gamma_{down}$ allows a user to control at what percentile in a range of x the long-term average settles (e.g., it is higher for higher ratios of $\gamma_{up}$ to $\gamma_{down}$).

The output of this adaptive far-end floor cue can be represented as $$Q1 = H[dB[x] > x_{LT} + \tau_2], \quad (8)$$

where higher values of $\tau_2$ are more selective to higher values of dB[x].

The near-end noise floor cue utilizes a noise power spectrum input, N, such that adaptation is prevented if the near-end envelope is not high enough above the noise envelope. In these embodiments, echo cannot dominate the signal if the near-end envelope is not high enough above the noise envelope. Therefore, mathematically, $$Q2 = H[y > N\tau_3], \tag{9}$$

where higher values of $\tau_3$ require higher minimum dominance over the ambient noise.

In exemplary embodiments, the maximum gain cue may be useful if there is an upper limit $g_{max}$ expected on the ratio y/x (the gain observation) if y is dominated by echo, while that maximum is often exceeded when y is dominated by near-end sources. In such an embodiment, a condition may be mathematically set such that $$Q3 = H[y < g_{max} x]. \tag{10}$$

Alternative cues may be devised to increase robustness of the system. The final output of the adaptation control module 414 may be obtained by combining all of the cues and applying an absolute maximum on the update speed, according to exemplary embodiments. This may be mathematically represented by, $$\mu = Q1 \cdot Q2 \cdot Q3 \cdot \mu_{max}, \tag{11}$$

In exemplary embodiments, the combination of all the cues being true (e.g., value=1) will result in adaptation. In contrast, if one or more the cues is false (e.g., value=0), adaptation will not occur.

Figure 5:
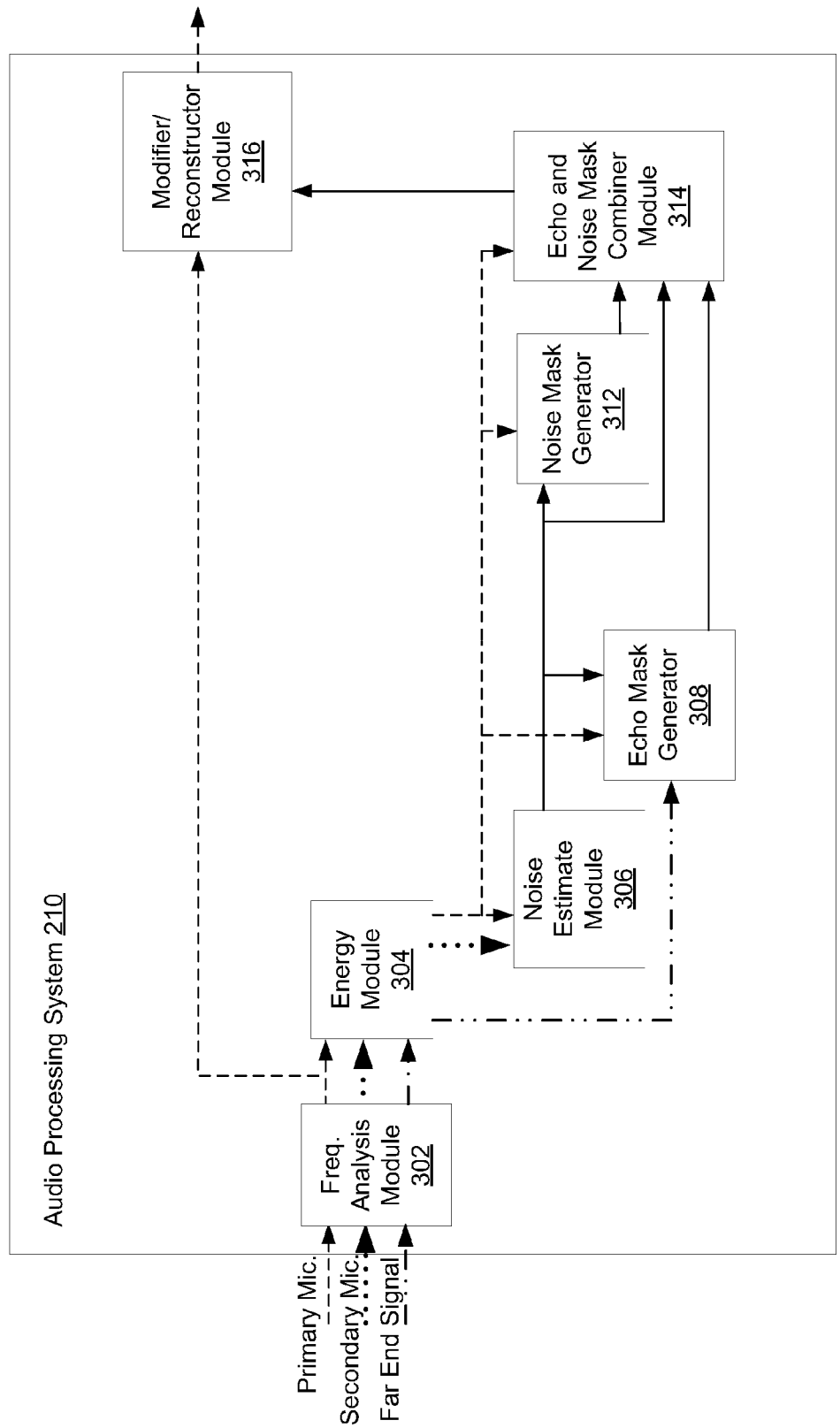
FIG. 5 is a block diagram of an alternative audio processing system.

An alternative embodiment of the audio processing system is shown in FIG. 5. In this embodiment, the total noise estimate module 310 is removed from the embodiment of FIG. 3. This embodiment may be utilized when the total noise estimate used in the system is not likely to be corrupted by echo. In one embodiment, the noise estimate may not be corrupted by echo when the system is designed to perform stationary noise reduction only. In this embodiment, the noise estimate from the noise estimate module 306 is the stationary noise estimate. In another embodiment, the noise estimate is not corrupted by echo when the non-stationary noise estimate is not corrupted by echo in a non-stationary noise reduction system. In these embodiments, there is no need for the echo mask generator 308 to influence the noise estimation process or for the second stage of the noise estimation (i.e., use of the total noise estimate module 310). Thus, the noise estimate module 306 may, in some embodiments, utilize the energy estimates for the primary and/or secondary acoustic signals to determine the noise estimate that will be used by the echo mask generator 308. The noise estimate is then provided to the echo mask generator 308 along with the energy from the far end signal. It should be noted that the embodiment of FIG. 5 may be applicable in situations where only the stationary noise component from the noise estimate module 306 is utilized or in situations where a noise estimate including both stationary and non-stationary noise components are utilized.

Figure 6:
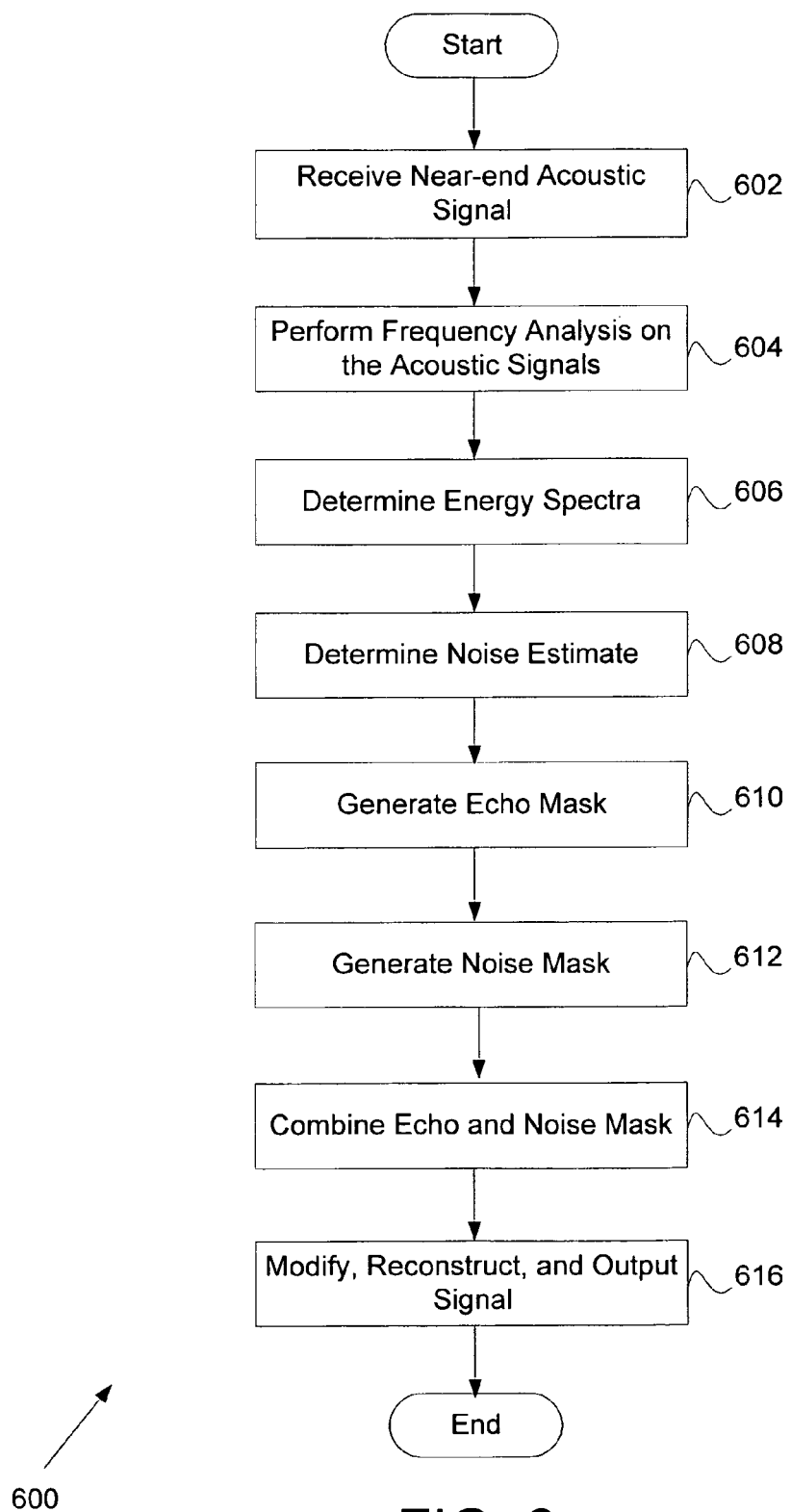
FIG. 6 is a flowchart of an exemplary method for envelope-based acoustic echo cancellation.

Referring now to FIG. 6, a flowchart 600 of an exemplary method for envelope-based acoustic echo cancellation is shown. In step 602, the acoustic signals are received by the communication device 104. In exemplary embodiments, a near-end acoustic signal is received by the primary microphones 106. A far-end acoustic signal may also be received via a receiver 200. If the far-end acoustic signal is being output through the speaker 108, then audio from the speaker 108 may leak back to the primary microphones 106. This may result in an echo being provided back to a listener at the far-end environment 112. In some embodiments, an optional secondary microphone 204 may also receive a secondary acoustic signal.

The acoustic signals are then converted to electric signals and processed through the frequency analysis module 302 to obtain frequency sub-bands in step 604. In one embodiment, the frequency analysis module 302 takes the acoustic signals and mimics the frequency analysis of a cochlea (i.e., cochlear domain) simulated by a filter bank. The result comprises frequency sub-bands.

In step 606, energy estimates for the acoustic signals are computed. In one embodiment, the energy estimates are determined by the energy module 304. The exemplary energy module 304 utilizes a present acoustic signal and a previously calculated energy estimate to determine the present energy estimate for each acoustic signal at each frequency sub-band.

Subsequently, the noise estimate is determined in step 608. According to embodiments of the present invention, the noise estimate for each frequency sub-band is based on the acoustic signal received at the primary microphone 106. The noise estimate may then be provided to the echo mask generator 308 and the total noise estimate module 310.

The echo mask is then generated in step 610. Step 610 will be discussed in more detail in connection with FIG. 7 below.

A noise suppression gain mask is generated in step 612. In exemplary embodiments a total noise estimate that may be echo free is determined by the total noise estimate module 310. In exemplary embodiments, the total noise estimate is determined for each frequency sub-band. In exemplary embodiments, the total noise estimate module 310 is configured to compute an estimate of the near-end noise power spectrum (e.g., time and frequency dependent portion of the acoustic signal that is not from the acoustic source 102). In some embodiments, the total noise estimate module 310 may refine the noise estimate received from the noise estimate module 306, which may be corrupted by echo power. The noise suppression gain mask may then be generated using the total noise estimate by the noise mask generator 312.

In step 614, a combined echo/noise suppression mask is generated. In exemplary embodiments, the combined echo and noise mask integration module 314 generates the combined echo/noise suppression mask. In one embodiment, the echo and noise mask integration module 314 may select a minimum between the two gain masks (i.e., noise gain mask and echo gain mask) for each sub-band, with a lower limit on how far below the noise gain mask the combined mask can be.

The result of the echo and noise mask integration module 314 is a final gain mask that may be used for modification of the primary acoustic signal from the primary microphone 106 in step 616. The modified signal may then be reconstructed and output.

Figure 7:
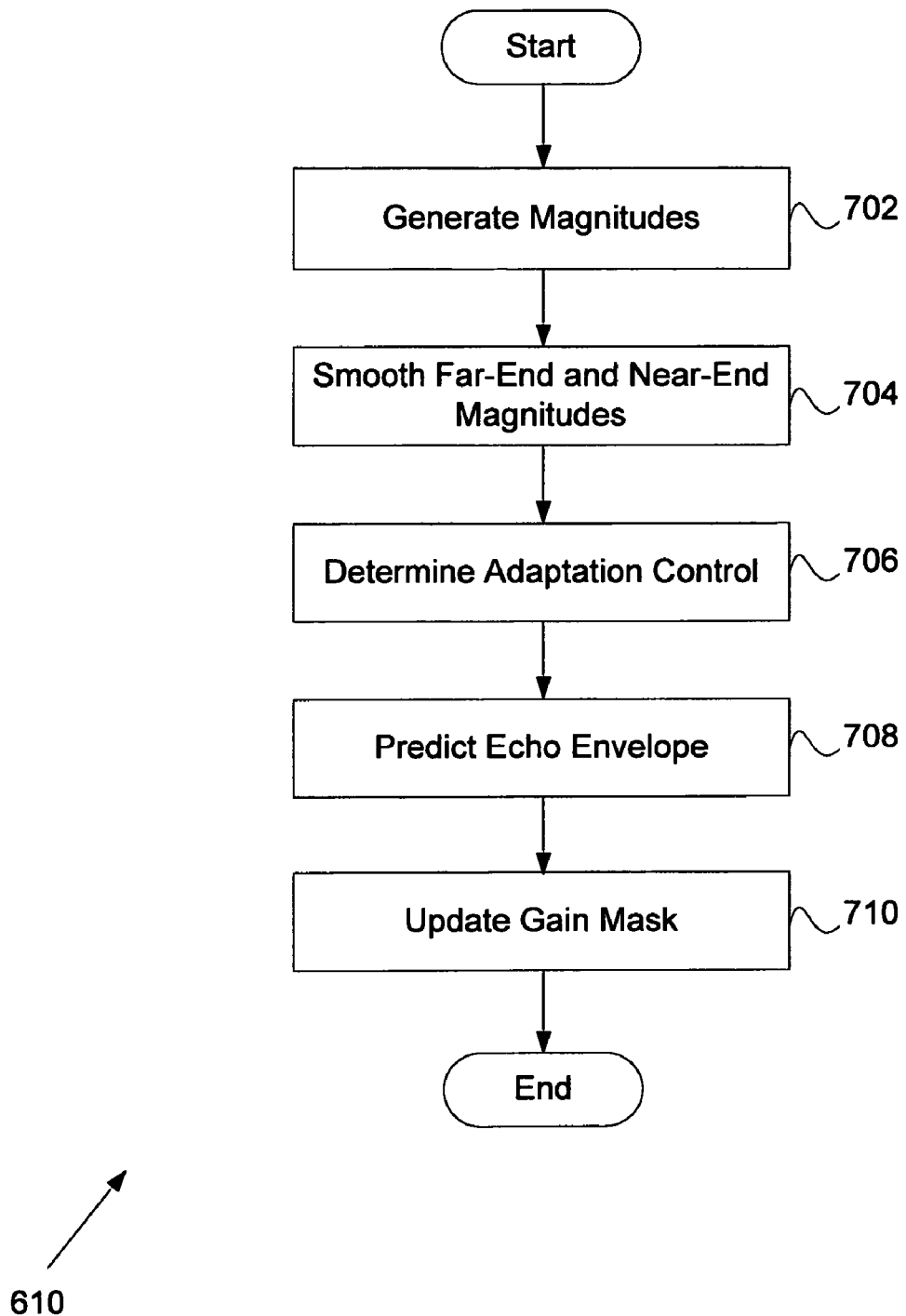
FIG. 7 is a flowchart of an exemplary method for determining an echo gain mask.

Referring now to FIG. 7, an exemplary flowchart of a method for generating the echo gain mask (step 610) is shown. In step 702, envelopes of the echo-free noise, far-end signal, and near-end signal (i.e., primary acoustic signal) are determined. In exemplary embodiments, the echo mask generator 308 receives the noise estimate, far-end signal energy spectra, and near-end signal energy spectra. These estimates and spectra are subjected to a square-root (sqrt) operation in the sqrt module 402. The sqrt operation transforms the power spectrum into magnitudes. For a given frequency band, a sequence of such magnitudes over time comprises an envelope (e.g., one amplitude per frame).

The far-end and near-end envelopes are then smoothed in step 704. The temporal smoothing removes "wiggles" in the envelope that may not be important for echo suppression. In one embodiment, the smoothing may be performed using a leaky integrator.

In step 708, the echo envelope is predicted. The echo predictor 406 is configured to use the far-end envelope (per frequency band) to predict its echo in the near-end envelope. In one embodiment, the echo predictor 406 may be simplified by assuming that the echo envelope is just a delayed and scaled version of the far-end envelope. In some embodiments, this representation may provide an accurate estimate due to low temporal resolution of the envelope (which is bolstered by smoothing).

The gain mask may be generated or updated in step 710. The gain mask may be generated by looking at a ratio between the echo prediction and the echo prediction power from the total near-end power.

Embodiments of the present invention adaptively estimate gain using the gain updater 412. In some embodiments, gain is updated quickly when echo is dominating the near-end signal, and updated slowly or not at all otherwise. In exemplary embodiments, the adaptation control module 414 provides the information necessary to determine how quickly to update gain. In some embodiments, the information may come in a form of a frame- and frequency-varying parameter μ. The larger μ is, the faster g is updated.

The above-described modules can be comprised of instructions that are stored on storage media. The instructions can be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, embodiments of the present invention may be applied to any system (e.g., non speech enhancement system) utilizing AEC. Therefore, these and other variations upon the exemplary embodiments are intended to be covered by the present invention.

The invention claimed is:

1. A method for envelope-based acoustic echo cancellation, comprising:
receiving a primary acoustic signal via a primary microphone and a far-end acoustic signal via a receiver;
performing frequency analysis on the primary acoustic signal and the far-end acoustic signal to obtain frequency sub-bands for the primary and far-end acoustic signals;
generating an echo gain mask for the frequency sub-bands so as to determine where and when echo may be audible in the frequency sub-bands, the echo gain mask being based on a magnitude envelope of the primary acoustic signal and a predicted echo envelope, the predicted echo envelope being determined by predicting an echo envelope based at least on a magnitude envelope of the far-end acoustic signal;
applying the echo gain mask to the primary acoustic signal to generate a masked signal; and
outputting the masked signal.

2. The method of claim 1 further comprising generating a noise gain mask based on at least the primary acoustic signal for each frequency sub-band.

3. The method of claim 2 wherein applying the echo gain mask to the primary acoustic signal to generate the masked signal comprises applying a combination of the echo gain mask and the noise gain mask to the primary acoustic signal to generate the mask signal.

4. The method of claim 3 wherein applying the combination of the echo gain mask and noise gain mask comprises selecting a minimum between the echo gain mask and noise gain mask for each sub-band.

5. The method of claim 3 wherein generating the noise gain mask comprises determining a substantially echo-free noise estimate.

6. The method of claim 1 further comprising receiving a secondary acoustic signal via a secondary microphone.

7. The method of claim 6 wherein generating the noise gain mask comprises factoring in the secondary acoustic signal.

8. The method of claim 1 wherein generating the echo gain mask comprises taking a square root of the far-end acoustic signal and the primary acoustic signal to form the magnitude envelopes of the far-end and primary acoustic signals.

9. The method of claim 8 further comprising smoothing the magnitude envelopes of the far-end and primary acoustic signals.

10. The method of claim 1 wherein generating the echo gain mask comprises determining an echo dominated noise estimate and using a square root of the echo dominated noise estimate to generate a noise magnitude envelope.

11. The method of claim 1 wherein generating the echo gain mask comprises predicting an echo envelope based on the magnitude envelopes of the far-end and primary acoustic signals.

12. The method of claim 1 wherein generating the echo gain mask comprises updating the gain based on one or more adaptation control cues.

13. The method of claim 12 wherein the adaptation control cue comprises an adaptive far-end noise floor.

14. The method of claim 12 wherein the adaptation control cue comprises a noise floor.

15. The method of claim 12 wherein the adaptation control cue comprises a maximum gain.

16. The method of claim 1 further comprising synthesizing the masked signal into time domain for outputting.

17. A system for envelope-based acoustic echo cancellation in a communication device, comprising:
acoustic sensors configured to receive a primary acoustic signal and a far-end acoustic signal;
a frequency analysis module configured to performing frequency analysis on the primary acoustic signal and the far-end acoustic signal to obtain frequency sub-bands for the primary and far-end acoustic signals;
an echo mask generator configured to generate an echo gain mask based on a magnitude envelope of the primary acoustic signal and based on a predicted echo envelope for each frequency sub-band, the predicted echo envelope being determined by predicting an echo envelope based at least on a magnitude envelope of the far-end acoustic signal;
a modifier/reconstructor module configured to apply the echo gain mask to the primary acoustic signal to generate a masked signal; and
an output device configured to output the masked signal.

18. The system of claim 17 further comprising a noise mask generator configured to generate a noise gain mask based on at least the primary acoustic signal for each frequency sub-band.

19. The system of claim 18 wherein the modifier/reconstructor module configured to apply the echo gain mask to the primary signal to generate the masked signal comprises the modifier/reconstructor module configured to apply a combination of the echo gain mask and the noise gain mask to the primary acoustic signal to generate the masked signal.

20. The system of claim 19 further comprising an echo and noise mask integration module configured to generate the combination of the echo gain mask and noise gain mask.

21. The system of claim 17 wherein the modifier/reconstructor module is further configured to convert the masked signal into time domain for outputting.

22. The system of claim 17 wherein the echo mask generator comprises an echo predictor configured to determine the predicted echo envelopes.

23. A machine readable storage medium having embodied thereon a program, the program providing instructions for a method for envelope-based acoustic echo cancellation in a communication device, comprising:

receiving a primary acoustic signal via a primary microphone and a far-end acoustic signal via a receiver;

performing frequency analysis on the primary acoustic signal and the far-end acoustic signal to obtain frequency sub-bands for the primary and far-end acoustic signals;

generating an echo gain mask based on a magnitude envelope of the primary acoustic signal and based on a predicted echo envelope for each frequency sub-band, the predicted echo envelope being determined by predicting an echo envelope based at least on a magnitude envelope of the far-end acoustic signal;

generating a noise gain mask based on at least the primary acoustic signal for each frequency sub-band;

applying a combination of the echo gain mask and noise gain mask to the primary acoustic signal to generate a masked signal; and outputting the masked signal.

\* \* \* \* \*